United States Patent [19]

Seeger

[11] 4,066,957

[45] Jan. 3, 1978

[54] CONTROL ARRANGEMENT FOR CONVERTER

[75] Inventor: Herbert Seeger, Essen, Germany

[73] Assignee: Fried. Krupp Gesellschaft mit beschrankter Haftung, Essen, Germany

[21] Appl. No.: 694,224

[22] Filed: June 9, 1976

[30] Foreign Application Priority Data

June 14, 1975 Germany .............................. 2526684

[51] Int. Cl.² .............................................. H02P 9/04
[52] U.S. Cl. ........................................ 322/16; 322/25; 322/29; 363/175
[58] Field of Search .................. 322/14, 15, 16, 25–28, 322/29; 321/62, 63, 64

[56] References Cited

U.S. PATENT DOCUMENTS 2,607,028  8/1952  Gartner .................................... 322/16
3,226,626  12/1965  Moore ..................................... 322/16

Primary Examiner—Robert J. Hickey
Attorney, Agent, or Firm—Spencer & Kaye

[57] ABSTRACT

A control arrangement for a converter of the type including a direct current motor driving a three-phase generator with at least one exciter coil of the generator and/or of the motor being fed from the three-phase mains of the generator via a series connected transformer and a rectifier. At least one secondary winding of the transformer is connected in a closed series circuit which further includes a controlled thyristor, and two other secondary windings of the transformer which other windings are connected in parallel. In dependence on the parameter of the converter to be regulated, the control current of the thyristor is varied to provide a two-point regulation of the saturation current for the transformer flowing through the closed series circuit.

9 Claims, 3 Drawing Figures

CONTROL ARRANGEMENT FOR CONVERTER

BACKGROUND OF THE INVENTION

The present invention relates to an improved control system for a converter of the type comprising a three-phase current generator driven by a direct current motor.

Converters of this type are utilized to supply current to loads, which may, for example, be motors to drive compressors and ventilators of the air-conditioning systems provided in the cars of a d.c. operated subway or intracity trains. In such use it is desirable to maintain the voltage and frequency of the three-phase current network supplied by the generator within the tolerances for which the loads are designed even if the direct voltage supplied to the motor rises, for example, by 25% with respect to its rated value or drops by 30%. Moreover, with a symmetrical load on the d.c. network, the voltages between any two phase lines at the output of the generator preferably should not deviate significantly from one another, i.e., the voltage differences, for example, should be no greater than ± 1%.

SUMMARY OF THE INVENTION

It is therefore the object of the invention to provide an improved control arrangement for a converter of the type comprising a three-phase current generator driven by a d.c. motor so that it is possible with simple means to maintain the conditions required for operation of the connected loads within close limits even with great fluctuations of the d.c. input voltage to the d.c. motor.

This is accomplished according to the invention in that the control arrangement for a converter of the above-mentioned type, which has at least one of the exciter coils of the motor and/or the generator being fed, via a three-phase transformer and a rectifier, from the three-phase mains of the generator, comprises: at least one closed circuit including the series connection of a secondary winding of the transformer, a controlled thyristor, and two other secondary windings of the transformer which are connected in parallel with each other; and means responsive to a selected parameter of the converter for varying the control current of the thyristor to provide a two-point regulation of the saturation current for the transistor flowing in the closed circuit.

According to the preferred embodiment of the invention, the current supplied to the exciter coil of the generator and the current supplied to the exciter coil of the d.c. motor are each controlled by respective control arrangements.

DETAILED DESCRIPTION OF THE PREFERRED EMBODIMENT

Figure 1:
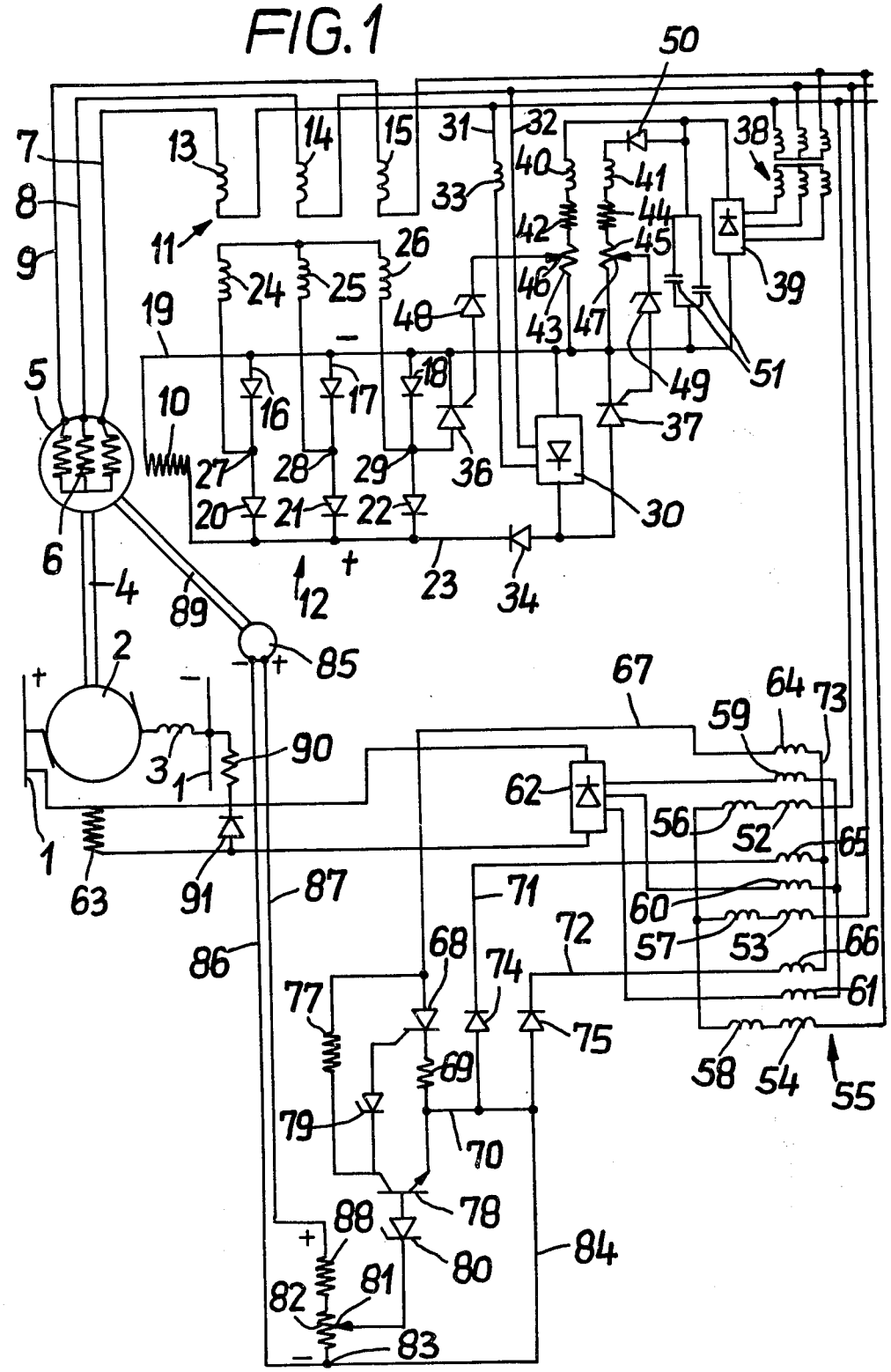
FIG. 1 is a circuit diagram for a converter with a control arrangement according to the preferred embodiment of the present invention.

Referring now to the Figures, there is shown a d.c. motor whose armature 2 is connected to a d.c. mains 1 of about 500 volts. The d.c. motor has a primary exciter winding 3 which is connected in series with the armature 2 and a secondary exciter winding 63 which has one end connected to the positive rail of the mains 1 and its other end connected, via an ohmic resistor 90 and a blocking diode 91, to the negative rail of mains 1. The armature 2 of the d.c. motor is mechanically coupled, through a shaft 4, to the rotor of an asynchronous three-phase current generator. The stator 5 of this generator includes a three-phase winding 6 in star or Y connection. This winding 6 is connected via three-phase lines 7, 8 and 9 to the loads, e.g. a.c. or three-phase current motors for operating the compressors and ventilators of the air-conditioners of a rail car.

The asynchronous three-phase current generator is provided with an exciter coil 10 which receives its current from a current transformer 11 via a rectifier 12. The current transformer 11 includes three primary windings 13, 14 and 15 which are each connected in series with one of the phase lines 7, 8 and 9, respectively. Rectifier 12 includes six diodes 16–22 in a three-phase bridge connection. Three of these diodes 16, 17 and 18 are connected to a line 19 which constituted the negative pole of the rectifier 12. The other three diodes 20, 21 and 22 are connected in series with the diodes 16, 17 and 18, respectively, and to a line 23 which constitutes the positive pole of the rectifier 12. The three secondary windings 24, 25 and 26 of the current transformer 11 are arranged in star or Y connection and connected to the common junction points 27, 28 and 29 between diodes 16 and 20, 17 and 21 and 18 and 22, respectively, which points constitute the input terminals of the rectifier 12. Thus the exciter coil 10, which is connected between the lines 19 and 23, will receive a current which is proportional to the load current, i.e., the current in the lines 7, 8 and 9.

Connected to lines 19 and 23 in parallel with rectifier 12 is a further rectifier 30. The input of this rectifier 30 is connected to only phase lines 7 and 8, by two lines 31, 32, respectively. Line 31 includes an inductive reactance 33. A blocking diode 34, which permits current to flow only in the direction from rectifier 30 to exciter coil 10 but not in the opposite direction, is disposed in the line 23 between the positive poles of rectifiers 12 and 30. The rectifier 30 is, for example, a conventional bridge rectifier circuit.

Rectifier 30 furnishes current to exciter coil 10 in parallel with rectifier 12. This is necessary because during idling of the converter, or with a small load, the current transformer 11 by itself would not furnish a sufficient or any excitation current.

In a branch line between junction point 29 and line 19, a thyristor 36 is provided with its anode connected to point 29 and its cathode connected to line 19. Moreover, in a branch line between lines 19 and 23, i.e., in parallel with excitation coil 10, a further thyristor 37 is provided with its anode connected to the positive pole of rectifier 30, i.e., line 23, and its cathode connected to the negative pole of rectifier 30, i.e., line 19.

To control thyristors 36 and 37, there is provided a star connected three-phase control transformer 38 whose three primary windings are connected to the phase lines 7, 8, 9, respectively, and whose secondary windings are connected to a three-phase control rectifier 39. The negative pole of control rectifier 39 is connected to line 19, i.e., the negative pole of rectifiers 12 and 30. The positive pole of control rectifier 39 is connected with line 19 by means of two parallel branch lines each of which includes a series connection of an inductive reactance 40 or 41 and two ohmic resistors 42, 43, or 44, 45, respectively. Each of the resistors 43 and 45 is provided with a tap 46 or 47, respectively, which is connected via a Zener diode 48 or 49 with the control electrode of thyristor 36 or 37, respectively. The Zener diodes 48 and 49 are provided between the taps 46 and 47 and the respective control electrodes of thyristors 36 and 37 to prevent the flow of control current in the direction toward the associated control electrode as long as the blocking voltage of the Zener diode has not been overcome.

The inductive reactance 41 is connected in series with a blocking diode 50, and two parallelly connected capacitors 51 are provided in parallel with the rectifier 39 and thus in parallel with the branch lines containing resistors 40 to 45.

The above-described circuit serves to keep the voltage in the three-phase mains 7, 8, 9 substantially constant even if the load fluctuates severely, e.g., when the motors of the air-conditioners start running or additional loads are switched on or off.

In particular, if the voltage in three-phase mains 7, 8 and 9 begins to exceed a given value, the voltage drop between tap 47 of resistor 45 and line 19 will be predominant over the blocking voltage of Zener diode 49. Consequently thyristor 37 will be fired so that rectifier 30 now sends current around exciter coil 10 through thyristor 37. When the voltage in three-phase mains 7, 8 and 9 begins to drop below the given value, the voltage drop between tap 47 and line 19 becomes less than the blocking voltage of Zener diode 49. Consequently thyristor 37 will be again blocked since rectifier 30 furnishes a pulsating voltage with gaps. When thyristor 37 is again blocked, rectifier 30 will again furnish current to exciter coil 10. This then produced a two-point control of the voltage in the three-phase mains.

If the voltage in the three-phase mains 7, 8 and 9, begins to rise above the given value, the voltage drop between tap 46 and line 19 also increases proportionally. If it is higher than the blocking voltage of the Zener diode 48, thyristor 36 is fired. Consequently a circuit is closed which includes, in series, the secondary winding 26, junction point 29, thyristor 36, line 19 and — in two branch lines — the parallel-connected diodes 16 and 17, the points 27 and 28 and the secondary windings 24 and 25, respectively. The direct current flowing through this circuit effects saturation of the current transformer 11. Consequently the induction decreases continuously so that finally secondary windings 24, 25 and 26 furnish almost no current to exciter coil 10.

If the voltage in three-phase network 7, 8 and 9 begins to drop below the given value, the voltage drop between tap 46 and line 19 falls below the blocking voltage of Zener diode 48 so that thyristor 36 is quenched. Consequently the saturation current, which had thus far been flowing through the above-mentioned circuit, disappears. The current transformer 11 thus again furnishes full current to the exciter coil 10.

This again is a two-point control with which — in cooperation with the two-point control via thyristor 37 and rectifier 30 — the voltage in three-phase mains 7, 8 and 9 is kept constant within the prescribed tolerances.

Figure 2:
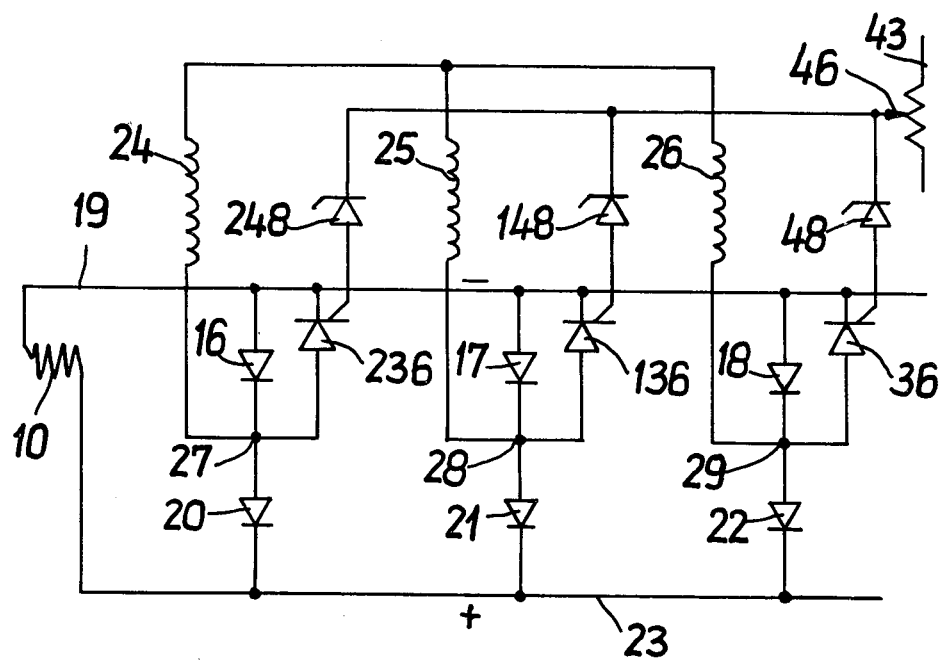
FIGS. 2 and 3 show details of FIG. 1 with or modifications of the circuit.

In a deviation from the circuit diagram shown in FIG. 1 it is also possible to employ two or three thyristors 36, 136, 236 (see FIG. 2) instead of the one thyristor 36, whose anodes are connected to one of points 27, 28 or 29 respectively and whose cathodes are all connected to line 19. The control electrodes of these thyristors are then — in the same manner as shown for thyristor 36 — connected to the tap 46 of resistor 43, each via a Zener diode 48, 148 or 248 respectively. The more thyristors are employed, the stronger is the saturation current so that the reduction of the excitation current induced by the current transformer becomes the more intensive.

If the voltage at the d.c. mains 1 fluctuates heavily, this would have the result — without a control system — that the number of revolutions of the direct current motor and of the three-phase current generator, and thus also the frequency in three-phase mains 7, 8 and 9, fluctuates correspondingly. This is prevented by the control device described hereafter.

Three primary windings 52, 53 and 54 of a further transformer 55 are connected to the three-phase lines 7, 8 and 9, respectively, of the three-phase mains and are combined in a star point, each via an inductive reactance 56, 57 and 58, respectively.

Three secondary windings 59, 60 and 61 of a transformer 55 furnish current to a three-phase rectifier 62 which feeds the exciter coil 63 of the d.c. motor with an additional excitation current.

Transformer 55 has three further secondary windings 64, 65 and 66 which are provided to regulate the excitation current and are disposed in a circuit for a direct saturation current. This circuit has a line 67 emanating from secondary winding 64 and connected to the anode of a thyristor 68. The cathode of this thyristor 68 is connected via an ohmic resistor 69 with a line 70 to which two branch lines 71 and 72 are connected in parallel. The branch line 71 includes the series connection of a blocking diode 744 and the secondary winding 65 of transformer 55 while the branch line 72 contains the series connection of the blocking diode 75 and the secondary winding 66. The opposite end of each of the secondary windings 65 and 66 is connected by means of a line 73 with secondary winding 64. The two blocking diodes 74, 75 disposed in branch lines 71, 72 prevent the flow of current from secondary windings 65 and 66 in the direction toward line 70.

The anode of thyristor 68 is connected via an ohmic resistor 77, with the collector of a transistor 78, whose emitter is connected to the line 70. The control electrode of thyristor 68 is connected to the collector of transistor 78 via a Zener diode 79 which is arranged so as to permit the flow of control current in the direction toward the control electrode of thyristor 68 only if the blocking voltage of the Zener diode 79 is overcome.

The base of transistor 78 is connected, via a further Zener diode 80, to a tap point 81 of an ohmic resistor 82 which at one end is connected at a point 83 to a line 84 which is connected with line 70. Zener diode 80 is arranged so as to permit current to flow to the base of transistor 78 only if its blocking voltage is overcome.

Point 83, and hence one end of resistor 82, is connected with the negative pole of a tachogenerator 85 via a line 86. The positive pole of tachogenerator 85 is connected, via a line 87, to a further ohmic resistor 88 which is connected in series with the other end of resistor 82. The rotor of tachogenerator 85 is connected via a shaft 89 with the rotor of the three-phase current generator.

With this arrangement, if the number of revolutions of d.c. motor 2, 3, 63 begins to drop below a given value as a result of a voltage drop at the direct voltage mains 1, the voltage furnished by tachogenerator 85 will decrease proportionally. If consequently the voltage drop between tap 81 and point 83 falls below the blocking voltage of Zener diode 80, transistor 78 becomes conductive and thyristor 68 is fired. Accordingly, a direct saturation current flows through a closed circuit formed of secondary winding 64, line 67, thyristor 68, resistor 69, line 70, the two parallel branches formed of diodes 74, 75, lines 71, 72 and secondary windings 65, 66, respectively, and finally line 73. Thus the induction of transformer 55 progressively drops so that finally rectifier 62 will no longer furnish any noticeable additional current to excitation coil 63. This results in an increase in the number of revolutions of the d.c. motor. If this number of revolutions begins to exceed the given value, the voltage drop between tap 81 and point 83 exceeds the blocking voltage of Zener diode 80. Consequently the saturation current in the above-mentioned circuit disappears so that rectifier 62 again furnishes the full additional current to excitation coil 63 which produces a reduction in the number of revolutions of the d.c. motor and of the three-phase generator.

Figure 3:
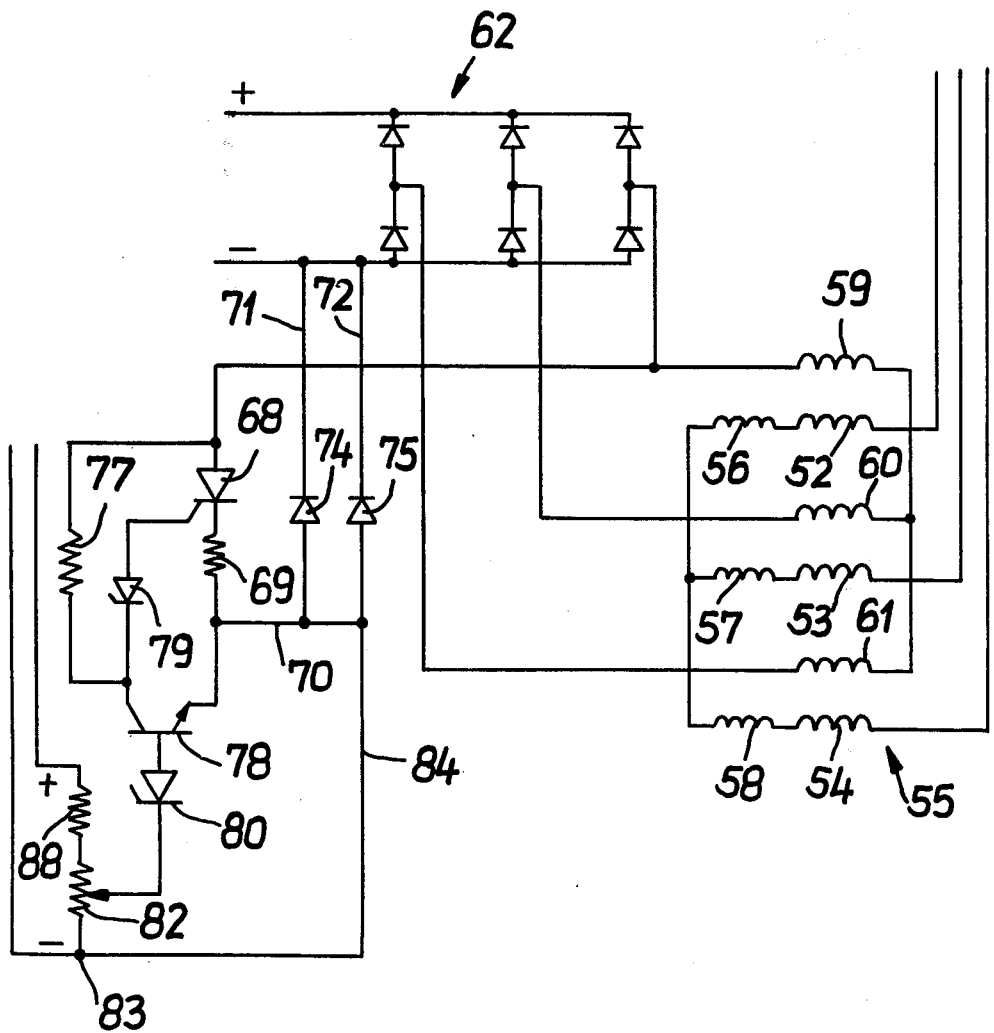

Thus if the number of revolutions fluctuate below and above the rated value, a two-point regulation is effected with which the number of revolutions of the d.c. motor and of the three-phase generator, and thus the frequency in the three-phase mains, are kept constant within the tolerances. Instead of transistor 78 it is also possible to use another circuit element in the same sense, e.g. a thyristor.

in a deviation from the circuit diagram shown in FIG. 1 the secondary windings 64, 65, 66 can be omitted if the thyristor 68 is connected with its anode to the secondary winding 59 and with its cathode to the negative pole of the three-phase rectifier 62 as shown in FIG. 3.

It is possible that, instead of only a single thyristor 68, two or three thyristors are each connected with their anodes to one of the secondary windings 59, 60 or 61 and with their cathodes to the negative pole of the rectifier 62 which is provided in three-phase current connection.

It will be understood that the above description of the present invention is susceptible to various modifications, changes and adaptations, and the same are intended to be comprehended within the meaning and range of equivalents of the appended claims.

What we claimed is:

1. In combination with a converter including a direct current motor having at least one exciter coil, a three-phase generator driven by said motor and having at least one exciter coil, and a circuit including a three-phase transformer, whose input is connected to the three-phase mains connected to the output of said generator, and a series connected three-phase rectifier, for feeding current to at least one of said exciter coils; a control means for controlling a selected parameter of said converter, said control means comprising in combination: at least one closed circuit including the series connection of a secondary winding of said transformer, a controlled thyristor, and two further secondary windings of said transformer which are connected in parallel with each other; and means responsive to said selected parameter for varying the control current of said thyristor to provide a two-point regulation of any saturation current for said transformer flowing through said closed circuit.

2. The apparatus defined in claim 1 wherein: said selected parameter is the voltage between the three-phase lines of said three-phase mains; said transformer is a three-phase current transformer having three primary windings, each connected in a respective one of said three-phase mains, and three secondary windings connected in a Y; said rectifier is a three-phase diode bridge rectifier; said at least one exciter coil is the exciter coil of said generator and is connected across the output of said rectifier; said thyristor of said at least one closed circuit is connected between one of the input terminals of said rectifier and the negative output pole of said rectifier; and said means for varying the control current of said thyristor includes a Zener diode connected to the control electrode of said thyristor, and means responsive to the voltage in said three-phase mains for producing a d.c. voltage proportional to the voltage between the lines of said three-phase mains and for applying said d.c. voltage to said Zener diode to cause said thyristor to be fired whenever the voltage between said lines of said three-phase mains rises to a given value.

3. The apparatus defined in claim 2 further comprising: a further rectifier having its output connected across said exciter coil of said generator in parallel with said first mentioned rectifier, and its input connected to two lines of said three-phase mains; a further controlled thyristor connected across the output of said further rectifier with the anode of said further controlled thyristor being connected to the positive output pole of said further rectifier; a further Zener diode connected to the control electrode of said further controlled thyristor; and further means connected to said further Zener diode and responsive to the voltage in said three-phase mains, for producing a d.c. voltage proportional to the voltage of said mains and for causing said further controlled thyristor to be fired when the voltage of said mains rises to a predetermined value.

4. The apparatus of claim 1 wherein: said selected parameter is the number of revolutions of said three-phase current generator; said exciter coil is an exciter coil of said d.c. motor; said transformer is a three-phase voltage transformer having three primary windings which are connected to the three-phase mains and are connected in a Y; said rectifier has its inputs connected to secondary windings of said transformer and its output connected to said exciter coil of said d.c. motor; said at least one closed circuit includes two diodes each of which being connected in series with each of the said two further secondary windings of said transformer which are connected in parallel with each other; and said means for varying the control current of said thyristor includes means for producing a d.c. voltage proportional to the number of revolutions of said three-phase generator, a first Zener diode connected to the control electrode of said thyristor, and circuit means connected to said d.c. voltage producing means and said first Zener diode for causing said thyristor to be quenched when the number of revolutions of said generator rises to a given value.

5. The apparatus defined in claim 4 wherein said circuit means includes: a transistor having its emitter connected to the cathode of said thyristor and its collector connected to said control electrode of said thyristor via said first Zener diode and to the anode of said thyristor via a resistor; a second Zener diode connected between the base of said transistor and the positive output pole of said means for producing a d.c. voltage; and means connecting the negative output pole of said means for producing a d.c. voltage to said emitter of said transistor.

6. The apparatus defined in claim 4 wherein the secondary windings included in said at least one closed circuit are additional secondary windings of said transformer, different from those secondary windings of said transformer to which the inputs of said rectifier are connected.

7. The apparatus defined in claim 4 wherein the secondary windings included in said at least one closed circuit are those secondary windings of said transformer to which the inputs of said rectifier are connected, whereas the cathode of said thyristor is connected to the negative pole of said rectifier.

8. The apparatus defined in claim 4 further comprising: a three-phase current transformer having three primary windings, each connected in a respective one of said three-phase lines, and three secondary windings connected in a Y; a three-phase diode bridge rectifier having its input connected to said secondary windings of said current transformer and its output poles connected across said exciter coil of said generator; a second controlled thyristor connected between one of the input terminals of said diode bridge rectifier and the negative output pole of said diode bridge rectifier; a third Zener diode connected to the control electrode of said second thyristor; and means responsive to the voltage in said three-phase mains for producing a d.c. voltage proportional to the voltage between the lines of said three-phase mains and for applying said d.c. voltage to said third Zener diode to cause said second thyristor to be fired whenever the voltage between said lines of said three-phase mains rises to a given value.

9. The apparatus defined in claim 8 further comprising: a further rectifier having its output connected across said exciter coil of said generator in parallel with said three-phase diode bridge rectifier, and its input connected to two of said three-phase lines; a third controlled thyristor connected across the output of said further rectifier with the anode of said third controlled thyristor being connected to the positive output pole of said further rectifier; a fourth Zener diode connected to the control electrode of said third controlled thyristor; and further means, connected to said fourth Zener diode and responsive to the voltage in said three-phase mains, for producing a d.c. voltage proportional to the voltage of said mains and for causing said third controlled thyristor to be fired when the voltage of said mains rises to a predetermined value.

* * * * *